United States Patent
Fujikawa

[11] Patent Number: 6,110,062
[45] Date of Patent: Aug. 29, 2000

[54] HYDRAULIC CONTROL SYSTEM FOR TRANSMISSION

[75] Inventor: Atsushi Fujikawa, Saitama, Japan

[73] Assignee: Honda Giken Kogyo Kabushiki Kaisha, Tokyo, Japan

[21] Appl. No.: 09/262,051

[22] Filed: Mar. 4, 1999

[30] Foreign Application Priority Data

Mar. 5, 1998 [JP] Japan .................................. 10-053313

[51] Int. Cl.⁷ .................................................. F16H 59/00
[52] U.S. Cl. ............................................... 474/28; 474/69
[58] Field of Search .................... 474/8, 18, 28, 474/70, 69

[56] References Cited

U.S. PATENT DOCUMENTS

| | | | |
|---|---|---|---|
| 5,183,439 | 2/1993 | Yumoto et al. ......................... | 474/28 |
| 5,409,421 | 4/1995 | Sakai et al. ........................... | 474/28 |
| 5,427,579 | 6/1995 | Kanehara et al. ...................... | 474/28 |
| 5,649,876 | 7/1997 | Morishita .............................. | 474/28 |
| 5,665,023 | 9/1997 | Aoki et al. ........................... | 474/28 X |
| 5,776,028 | 7/1998 | Matsuda et al. ...................... | 474/28 X |

FOREIGN PATENT DOCUMENTS

| | | | |
|---|---|---|---|
| 0 228 817 | 7/1987 | European Pat. Off. ........ | F16H 11/02 |
| 0 813 005 | 12/1997 | European Pat. Off. ........ | F16H 61/16 |
| 44 10 311 | 9/1985 | Germany ........................ | F16H 61/00 |
| 195 33 976 | 3/1997 | Germany ........................ | F16H 61/00 |

*Primary Examiner*—Charles A. Marmor
*Assistant Examiner*—Saúl Rodríguez
*Attorney, Agent, or Firm*—Sughrue, Mion, Zinn, Macpeak & Seas, PLLC

[57] ABSTRACT

A transmission is constituted by drive and driven side movable pulleys (11 and 16), a metallic V belt (15) and drive and driven side cylinder chambers (14 and 19) for controlling the width of both pulleys. A hydraulic control system for the transmission, according to the present invention, is characterized as follow. The line pressure (PL) is set using first and second regulator valves (31, 32). First control oil pressure (PC1) supplied to the drive side cylinder chamber is controlled using a first linear solenoid valve (41) and a first pulley control valve (43). Second control oil pressure (PC2) supplied to the driven side cylinder chamber is set using a second linear solenoid valve (45) and a second pulley control valve (47). In addition, first and second regulator valves (31, 32) regulates the line pressure using control back pressure which is the higher of first and second control back pressure respectively set by the first and second linear solenoid valves (41, 45).

5 Claims, 8 Drawing Sheets

PRIOR ART

FIG. 7

PRIOR ART

HYDRAULIC CONTROL SYSTEM FOR TRANSMISSION

BACKGROUND OF THE INVENTION

The present invention relates to a hydraulic control system for controlling the width of a drive pulley and a driven pulley in a belt-type continuous variable transmission, more particularly relates to the hydraulic control system provided with valves for respectively directly controlling oil pressure for controlling the width of the drive pulley and the driven pulley.

A belt-type continuous variable transmission (in other words, a continuous variable V-belt transmission) comprising a pulley width variable drive pulley, a pulley width variable driven pulley and a belt member wound between these drive pulley and driven pulley is already well-known and is practically used. The above transmission is provided with a drive side hydraulic actuator for controlling the width of the drive pulley and a driven side hydraulic actuator for controlling the width of the driven pulley, controls the setting of pulley width by controlling oil pressure supplied to both hydraulic actuators and can variably set transmission gear ratio steplessly and continuously.

Figure 7:
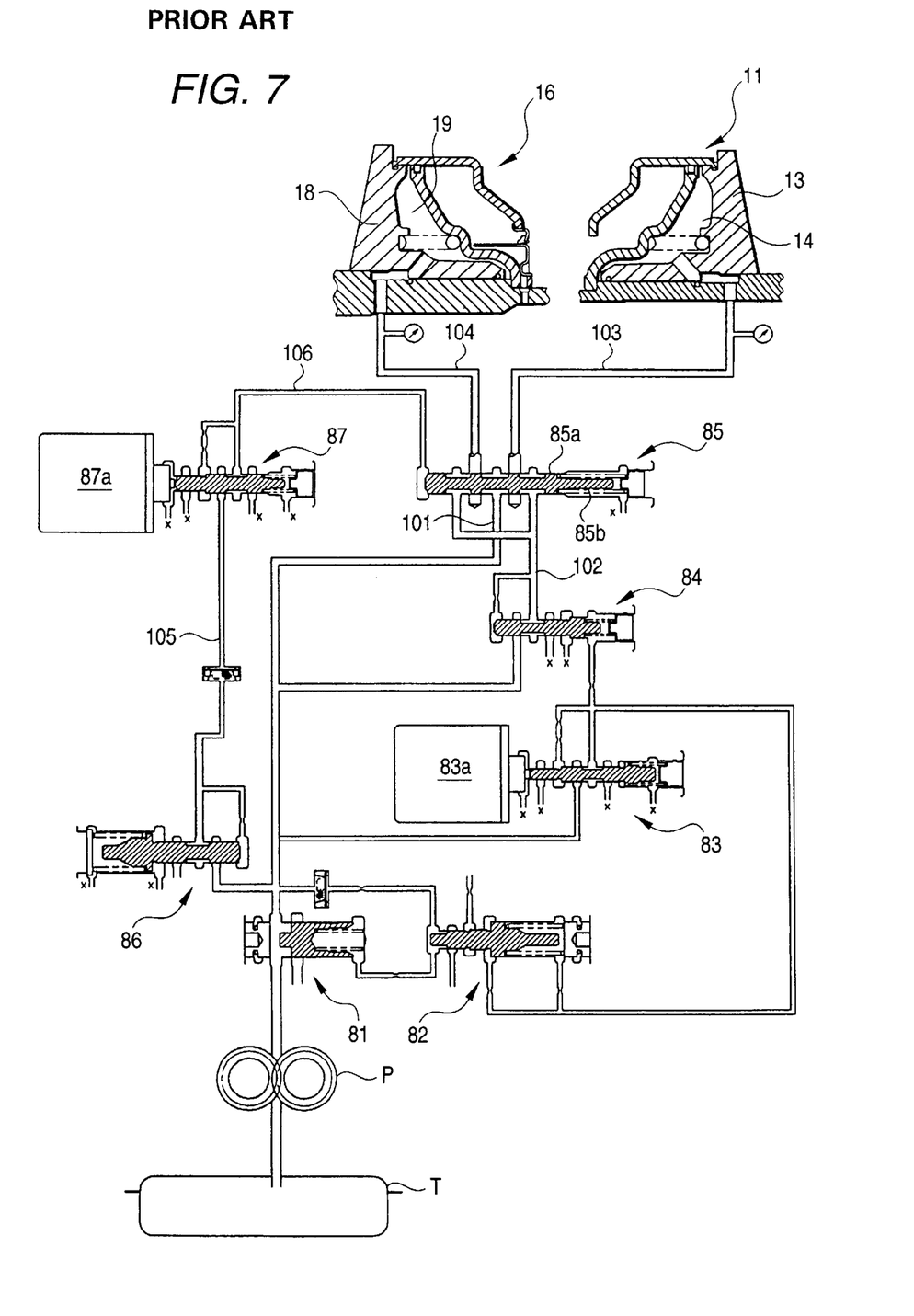
FIG. 7 is a hydraulic circuit diagram showing an example of a conventional type hydraulic control system.

For such a system for controlling oil pressure supplied to a hydraulic actuator, there is a system using a four-way valve disclosed in Japanese Patent Unexamined Publication No. Hei. 8-219188 based on an application which is filed by this applicant into Japanese Patent Office. FIG. 7 shows a control system using such a four-way valve and the control system will be briefly described below. First, a continuous variable transmission is constituted so that transmission control is executed by controlling lateral pressure which acts upon a movable pulley half 13 of a drive pulley 11 based upon oil pressure in a drive side cylinder chamber 14 and also controlling lateral pressure which acts upon a movable pulley half 18 of a driven pulley 16 based upon oil pressure in a driven side cylinder chamber 19.

The above hydraulic control system controls oil pressure supplied to these drive and driven side cylinder chambers 14 and 19, produces line pressure PL by regulating the oil pressure of hydraulic fluid in a tank T supplied from a pump P using regulator valves 81 and 82 and produces modulator pressure PM by decompressing the line pressure using a modulator valve 86.

The line pressure PL is supplied to a high/low-pressure control valve 83, control back pressure corresponding to control over the energizing of its linear solenoid 83a is regulated using the high/low-pressure control valve 83 and supplied to a low-pressure regulator valve 84. Line pressure PL is supplied to the low-pressure regulator valve 84, is regulated corresponding to control back pressure and low control pressure is supplied to right and left inlet ports of a shift valve 85 comprised of a four-way valve via a line 102. In the meantime, line pressure PL is supplied from a line 101 as it is to the inlet port in the center of the shift valve 85 and these oil pressures (line pressure PL and low control pressure) are respectively distributed and supplied to the drive side and the driven side cylinder chambers 14 and 19 via lines 103 and 104 by the operation of the shift valve 85.

In the meantime, modulator pressure PM is supplied to a shift control valve 87 via a line 105, the shift control valve 87 produces shift control oil pressure according to control over energizing a linear solenoid 87a and supplies the shift control oil pressure to the shift valve 85 via a line 106. As shown in FIG. 7, the shift valve 85 is provided with a spool 85a pressed left by a spring 85b and control oil pressure applies rightward pressure to the spool 85a. Therefore, the position of the spool 85a can be controlled by controlling the magnitude of control oil pressure and hereby, transmission control is executed by controlling respectively distributing line pressure PL from a central inlet port and low control pressure from the right and left inlet ports from the lines 103 and 105.

Line pressure and low control pressure controlled so that line pressure and low control pressure are correctly distributed as described above mean oil pressure provided with fixed differential pressure determined by the low-pressure regulator valve 84 and the magnitude of both is arbitrarily set by the high/low-pressure control valve 83.

A hydraulic control system using separate valves for respectively directly controlling oil pressure supplied to the drive and driven side hydraulic actuators is also proposed as in Japanese Patent Examined Publication No. Hei. 6-74839 for example.

This publication discloses such a hydraulic control system shown in FIG. 8 and referring to FIG. 8, the hydraulic control system will be described briefly below. As the configuration of a continuous variable transmission to be controlled is the same as that shown in FIG. 7, the same reference number is allocated and the description is omitted. In the hydraulic control system, the oil pressure of hydraulic fluid in a tank T supplied from a pump P is regulated by regulator valves 91 and 92, line pressure PL is produced and modulator pressure PM is produced by decompressing the line pressure by a modulator valve 93.

The modulator pressure PM is supplied to first and second linear solenoid valves 94 and 96 respectively via lines 111a and 111b and desired first and second control back pressures PB1 and PB2 are respectively supplied to lines 112a and 112b by controlling the energizing of linear solenoids 94a and 96a. The above first and second control back pressures PB1 and PB2 are respectively supplied to first and second pulley control valves 95 and 97 as shown in FIG. 8, these pulley control valves 95 and 97 regulate line pressure PL supplied via a line 114 and produce first and second control oil pressure PC1 and PC2 respectively corresponding to the first and second control back pressure PB1 and PB2. The first and second control oil pressures PC1 and PC2 produced as described above are respectively supplied to the drive side and driven side cylinder chambers 14 and 19 via lines 113a and 113b.

As described above, in the hydraulic control system, transmission control is executed by controlling the first and second control oil pressure PC1 and PC2 respectively supplied to the drive and driven side cylinder chambers 14 and 19 by controlling the energizing of the linear solenoids 94a and 96a and controlling varying the width of the drive pulley and the driven pulley.

In the hydraulic control system, a third linear solenoid valve 98 for receiving modulator pressure PM via a line 111c and producing third control back pressure according to the energizing of a linear solenoid 98a is further provided. The third control back pressure is supplied to the regulator valve 92 via a line 115 and line pressure PL regulated and set by the regulator valves 91 and 92 can be arbitrarily controlled.

As described above, heretofore, various hydraulic control systems are proposed, however, first, in the case of the hydraulic control system shown in FIG. 7, as line pressure PL is provided with fixed differential pressure from low control oil pressure, there is a problem that excessive differential pressure causes the useless work of the pump P in an area in which the differential pressure of control oil pressure supplied to the drive and driven side cylinder chambers 14 and 19 is not required so much, and the deterioration of fuel consumption and the rise of oil temperature may be caused.

Further, as line pressure PL is provided with fixed differential pressure from low control oil pressure, there is a problem that transmission speed is restricted by differential pressure set as described above and if transmission is to be sped up, transmission speed cannot be set to speed exceeding speed-based upon the differential pressure. The more the differential pressure is, the faster transmission speed can be, however, if differential pressure is increased, a problem of the deterioration of fuel consumption and the rise of oil temperature when differential pressure is not required becomes more remarkable.

Figure 8:
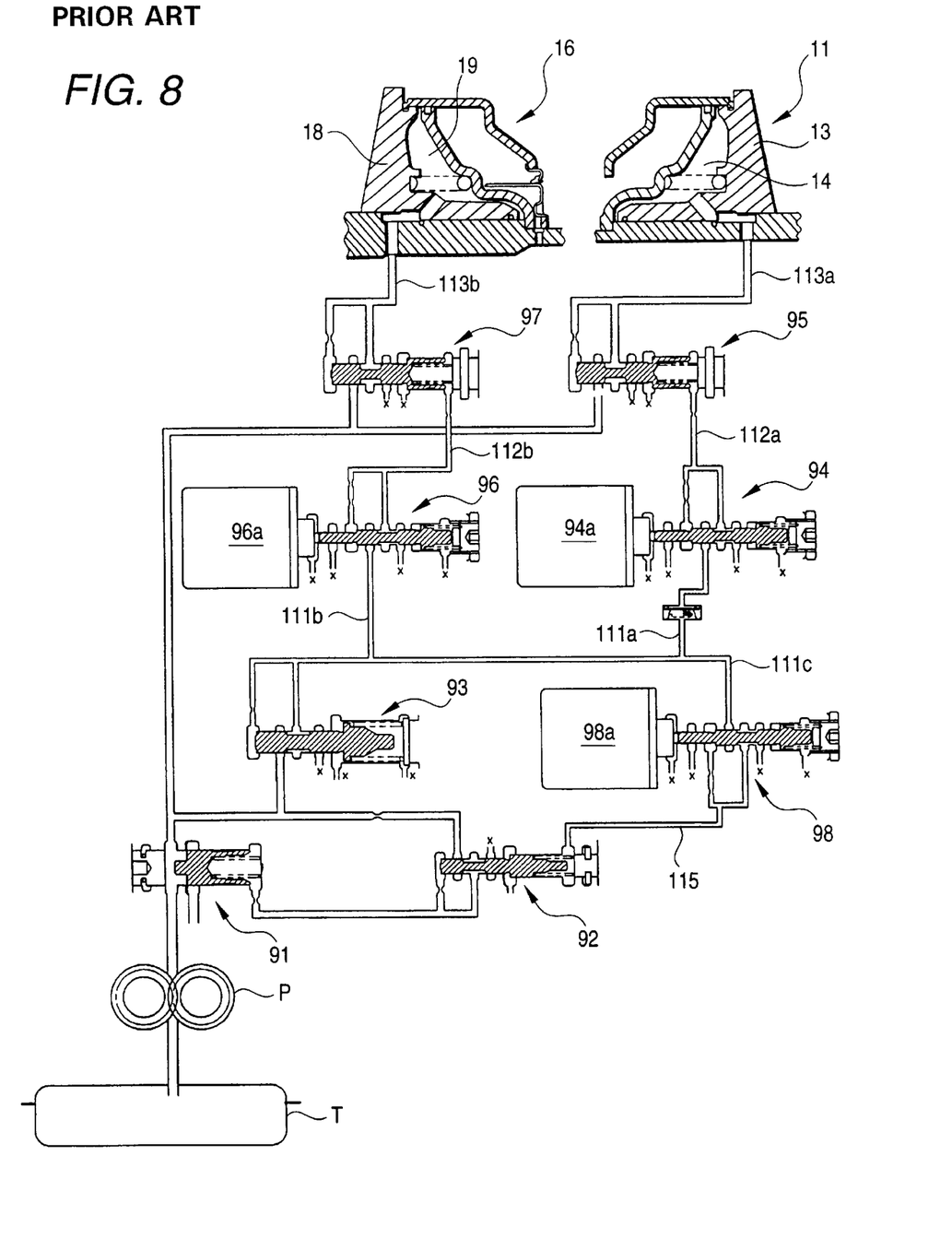
FIG. 8 is a hydraulic circuit diagram showing another example of a conventional type hydraulic control system.

In the meantime, in the case of the hydraulic control system shown in FIG. 8, as line pressure PL can be independently controlled by the third linear solenoid valve 98, it is considered that the above problems can be solved. However, in the system, the control system is required to be constituted using the total three solenoid valves of the first to third linear solenoid valves 94, 96 and 98 and there is a problem that the configuration of the control system is complicated and the cost is increased. Further, these three solenoid valves are required to be independently controlled and there is also a problem that control is difficult (a load upon control software is increased).

In the above Japanese Patent Examined Publication No. Hei. 6-74839, an example in which line pressure is set based upon the control oil pressure of the higher of control oil pressure respectively supplied to the drive and driven cylinder chambers is disclosed. In this case, there is an advantage that line pressure can be also set only by the solenoid valve for regulating control oil pressure supplied to the drive and driven side cylinder chambers. However, as in the system, line pressure is set using control oil pressure itself supplied to the drive and driven side cylinder chambers respectively provided with large volume, there is a problem that the rise of oil pressure is delayed in a process for supplying and filling oil to the cylinder chamber for example when speed is varied (particularly speed is rapidly varied) and the rise of line pressure is also delayed, that is, line pressure control delay may be caused.

Further, in case the volume of the drive and driven side cylinder chambers is different, the control oil pressure of the higher side is different between thecaseofup-shift speed varying control and the case of down-shift speed varying control and the characteristic of delay in the rise of oil pressure when speed is varied is also different. Therefore, there is a problem that the characteristic of the rise of line pressure may be different and control speed may be different between up-shift and downshift.

SUMMARY OF THE INVENTION

The present invention is made in view of such problems, so it is an object of the present invention to provide a hydraulic control system for a transmission wherein suitable differential pressure can be always set for the control oil pressure of a required drive pulley and driven pulley, the number of required control means such as linear solenoid valves is minimized, the configuration of the control system can be simplified and further, a problem of the delay of control is never occurred.

The above-mentioned object can be achieved by a hydraulic control system, according to the present invention, for a transmission including a pulley width variable drive pulley, a pulley width variable driven pulley, a belt member wound between the drive pulley and the driven pulley, a drive side hydraulic actuator for controlling a width of the drive pulley, and a driven side hydraulic actuator for controlling a width of the driven pulley, the hydraulic control system comprising:

regulator valve means for regulating line pressure;

a first solenoid valve for producing first control back pressure based upon a control electric signal;

a first pulley control valve for regulating the line pressure on the basis of the first control back pressure, and simultaneously setting first control oil pressure supplied to the drive side hydraulic actuator;

a second solenoid valve for producing second control back pressure based upon control electric signal; and a second pulley control valve for regulating the line pressure on the basis of the second control back pressure and simultaneously setting second control oil pressure supplied to the driven side hydraulic actuator, wherein:

the regulator valve means regulates and sets the line pressure in accordance with control back pressure which is the higher of the first and second control back pressures.

In the above-mentioned hydraulic control system according to the present invention, it is preferable that the regulator valve means includes a regulator valve which comprises:

a spring;

a first spool pressed by a spring in a first horizontal direction; and a second spool engageable with the first spool and movable relative to the first spool in a second direction opposite to the first direction and apart from the first spool, in which the second spool is moved in one of the first and second directions in accordance with a difference between the first and second control back pressures.

Further, in the above-described hydraulic control system, it is more preferable that the line pressure is regulated in accordance with a third control back pressure which is equal to the resultant force of an urging pressure of the spring and one of the first and second control back pressures.

However, if required, it is possible to modify the construction in such a manner that the spring is eliminated.

In the case of such a hydraulic control system, as line pressure PL is set according to the oil pressure (the back pressure) of the higher of the first and second control back pressure PB1 and PB2, line pressure PL can be set to oil pressure corresponding to the control oil pressure of the higher of these even if difference between the first and second control oil pressure is large or small, and the deterioration of fuel consumption and the rise of oil temperature caused because excessive differential pressure is set as in a conventional type system (the system shown in FIG. 7) can be prevented.

As line pressure PL is controlled not using first and second control oil pressure PC1 and PC2 itself respectively supplied to the drive and driven side hydraulic actuators, that is, oil pressure for controlling pulley width itself but using first and second control back pressure PB1 and PB2 for setting these, the control of the variation of line pressure corresponding to the variation of control oil pressure is never delayed and the responsibility of control is enhanced. Even if the volume of the drive and driven side hydraulic actuators is different, the same line pressure control characteristic is applied to up-shift and down-shift. In this control system, as line pressure is also automatically regulated only by controlling the first and second linear solenoid valves, only two solenoid valves and others are required and the configuration of the system is simplified.

DETAILED DESCRIPTION OF THE PREFERRED EMBODIMENTS

Figure 1:
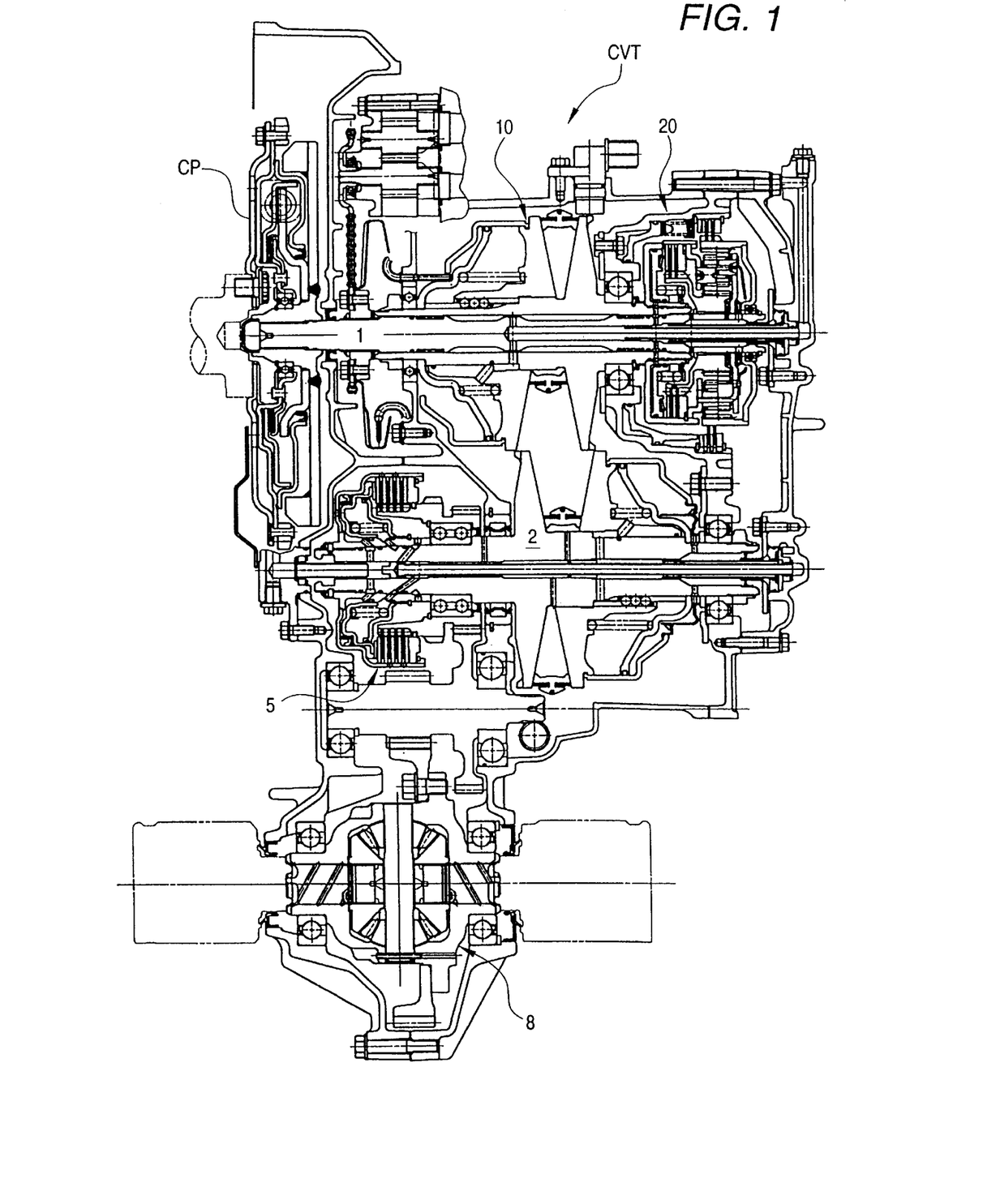
FIG. 1 is a sectional view showing a continuous variable transmission provided with a hydraulic control system according to the present invention.
Figure 2:
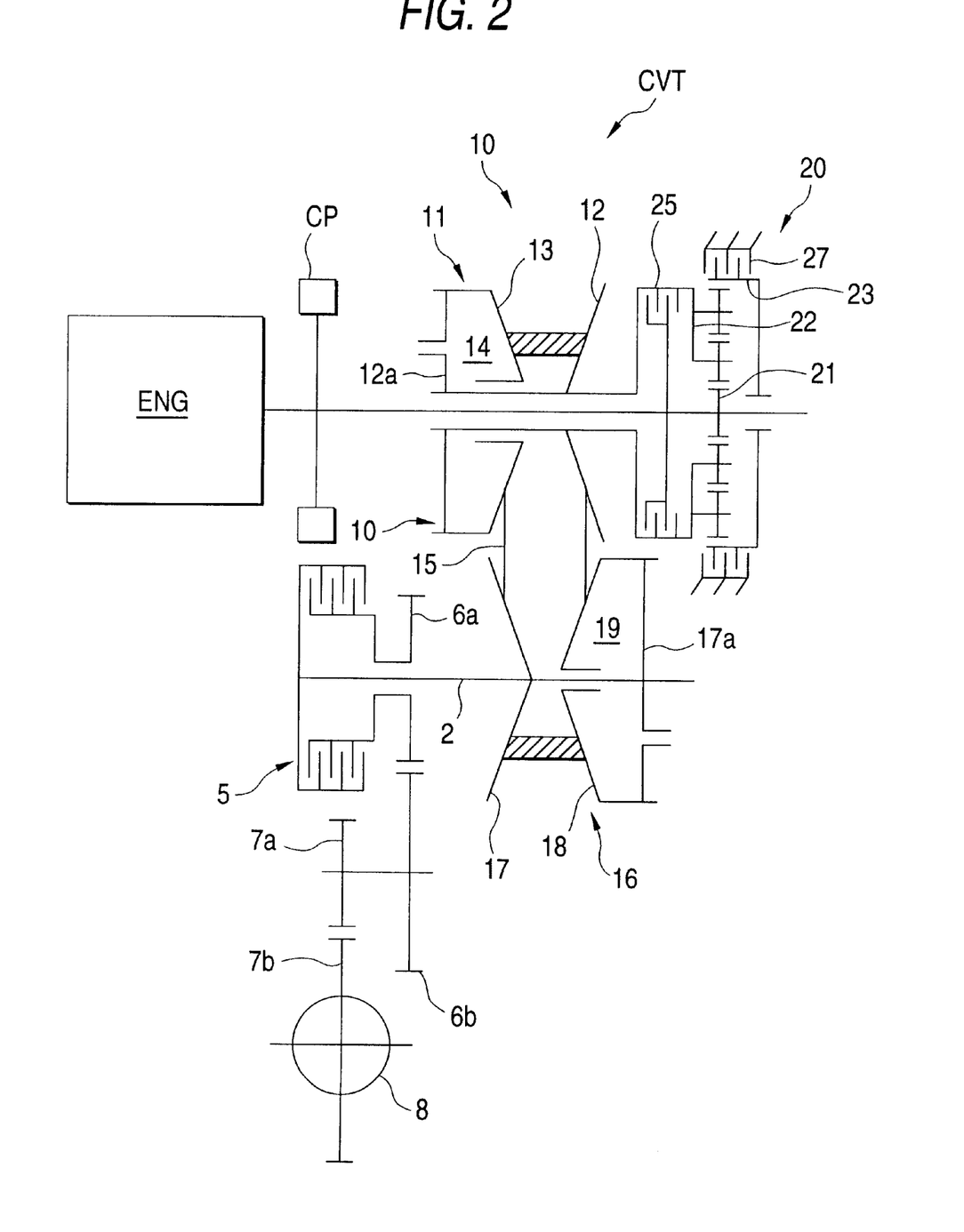
FIG. 2 is a schematic drawing showing the motive power transmission path of the continuous variable transmission.

Referring to the drawings, the preferred embodiments of the present invention will be described below. FIGS. 1 and 2 show the constitution of a continuous variable transmission provided with a hydraulic control system according to the present invention. The continuous variable transmission is a belt-type continuous variable transmission using a metallic V belt and the belt-type continuous variable transmission CVT is constituted by a metallic V belt mechanism 10 arranged between an input shaft 1 and a counter shaft 2, a planetary gear forward/backward travel switching mechanism 20 arranged between the input shaft 1 and a drive side movable pulley 11 and a main clutch 5 arranged between the counter shaft 2 and an output member such as a differential mechanism 8. This continuous variable transmission CVT is used for a vehicle, the input shaft 1 is connected to the output shaft of an engine ENG via a coupling mechanism CP and motive power transmitted to the differential mechanism 8 is transmitted to right and left wheels.

The metallic V belt mechanism 10 is comprised of the drive side movable pulley 11 arranged on the input shaft 1, a driven side movable pulley 16 arranged on the counter shaft 2 and a metallic V belt 15 wound between both pulleys 11 and 16. As the metallic V belt mechanism has the same constitution as a conventional type metallic V belt mechanism shown in FIGS. 7 and 8, the same reference number is allocated.

The drive side movable pulley 11 is comprised of a stationary pulley half 12 arranged on the input shaft 1 so that the half can be rotated and a movable pulley half 13 which can be relatively moved to the stationary pulley half 12 axially. On the side of the movable pulley half 13, a cylinder chamber 14 on the drive side is formed with the chamber surrounded by a cylinder wall 12*a* connected to the stationary pulley half 12 and lateral pressure for moving the movable pulley half 13 axially is generated by oil pressure supplied to the drive side cylinder chamber 14.

A driven side movable pulley 16 is comprised of a stationary pulley half 17 fixed to the counter shaft 2 and a movable pulley half 18 which can be relatively moved to the stationary pulley half 17 axially. On the side of the movable pulley half 18, a driven side cylinder chamber 19 is formed with the chamber surrounded by a cylinder wall 17*a* connected to the stationary pulley half 17 and lateral pressure for moving the movable pulley half 18 axially is generated by oil pressure supplied to the driven side cylinder chamber 19.

Therefore, suitable pulley lateral pressure for preventing the belt 15 from slipping-off can be set by suitably controlling oil pressure supplied to the above both cylinder chambers 14 and 19, the width of both pulleys 11 and 16 can be varied and hereby, transmission gear ratio can be varied steplessly and continuously by varying a radius in which the V belt 15 is wound.

The planetary-gear forward-rearward drive shift mechanism 20 is provided with a double pinion-type planetary gear train, its sun gear 21 is connected to the input shaft 1, a carrier 22 is connected to the stationary pulley half 12 and a ring gear 23 can be fixed and held by a backward brake 27. The planetary gear forward/backward travel switching mechanism is also provided with a forward clutch 25 which can connect the sun gear 21 and the ring gear 23, when the forward clutch 25 is fitted, all gears 21, 22 and 23 are rotated with them integrated with the input shaft 1and the pulley on the drive side 11 is driven in the same (forward) direction as the input shaft 1. In the meantime, as the ring gear 23 is fixed and held when a backward brake 27 is fitted, the carrier 22 is driven in the reverse direction to the sun gear 21 and the pulley on the drive side 11 is driven in a reverse (backward) direction to the input shaft 1.

The main clutch 5 is a clutch for controlling the transmission of motive power between the counter shaft 2 and the member on the output side, when the clutch is coupled, motive power can be transmitted between both and the capacity of transmitted torque between the input side and the output side can be also controlled by controlling engagement. Therefore, when the main clutch 5 is coupled, the output of the engine transmitted by the metallic V belt mechanism 10 is transmitted to the differential mechanism 8 via gears 6*a*, 6*b*, 7*a* and 7*b* and divided into right and left wheels not shown by the differential mechanism 8. When the main clutch 5 is released, motive power is not transmitted and the transmission is in a neutral condition.

Figure 3:
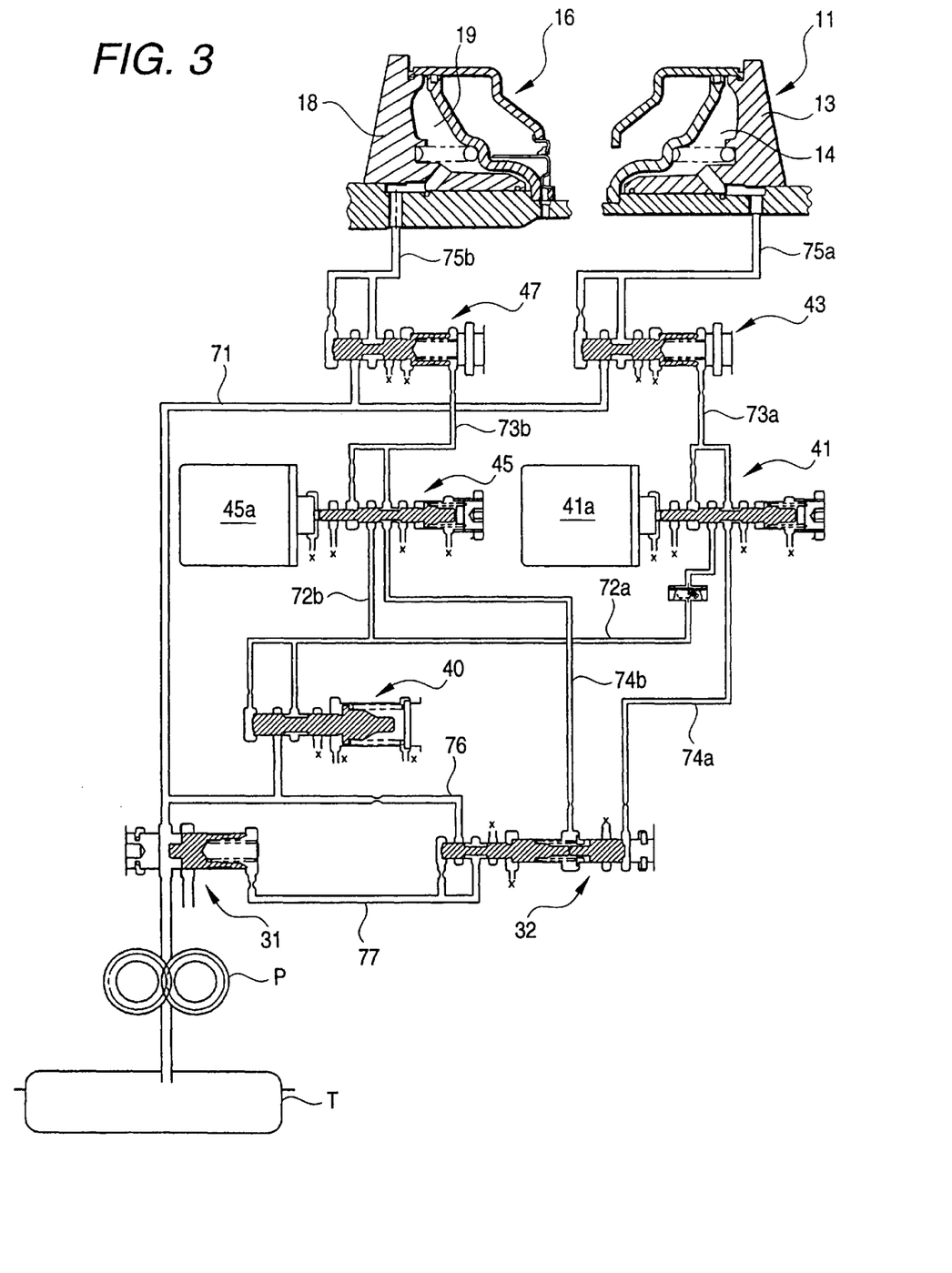
FIG. 3 is a hydraulic circuit diagram showing the configuration of a hydraulic control system equivalent to an embodiment of the present invention.
Figure 4:
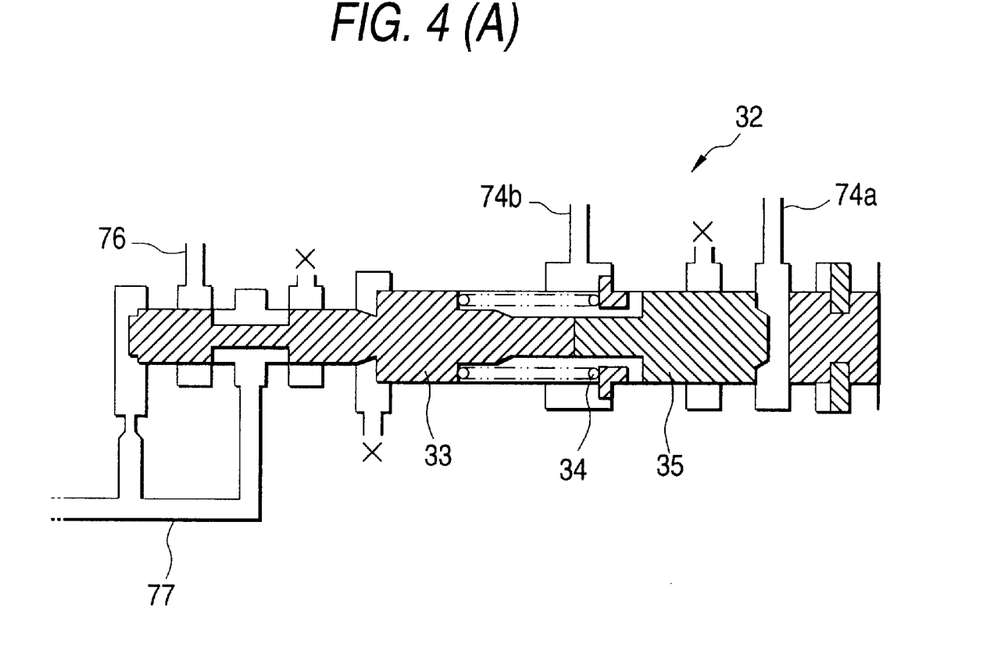
FIGS. 4(A) and 4(B) are sectional views showing a second regulator valve constituting the hydraulic control system in detail.

The hydraulic control system according to the present invention controls transmission by controlling the supply of oil pressure to the drive side cylinder chamber 14 and the driven side cylinder chamber 19 in the metallic V belt mechanism 10 and referring to FIG. 3, the constitution will be described below. Marks x in FIGS. 4 denote that a part shown by the mark is connected to a drain, such as a discharge oil path.

In the hydraulic control system, the oil pressure of hydraulic oil in a tank T supplied from a pump P is regulated by first and second regulator valves 31 and 32 so that oil pressure in a line 71 is line pressure PL and modulator pressure PM is produced by decompressing the line pressure PL using a modulator valve 40.

The modulator pressure PM is supplied to first and second linear solenoid valves 41 and 45 respectively via lines 72*a* and 72b and desired first and second control back pressures PB1 and PB2 are respectively supplied to lines 73a and 73b by controlling the energizing (controlling operation according to control electric signal) of linear solenoids 41a and 45a. The control electric signal means electric signal set according to a state in which a vehicle is driven though it is not shown in FIG. 3. The above first and second control back pressures PB1 and PB2 are respectively supplied to first and second pulley control valves 43 and 47 as shown in FIG. 3, the pulley control valves 43 and 47 regulate line pressure PL supplied via the line 71 to produce first and second control oil pressure PC1 and PC2 respectively corresponding to the first and second control back pressure PB1 and PB2. The first and second control oil pressures PC1 and PC2 produced by as described above are respectively supplied to the drive side cylinder chamber 14 and the driven side cylinder chamber 19 via lines 75a and 75b.

If the first and second linear solenoid valves 41 and 45 and the first and second pulley control valves 43 and 47 are used as described above, transmission can be controlled by controlling the first and second control oil pressure PC1 and PC2 respectively supplied to the drive side cylinder chamber 14 and the driven side cylinder chamber 19 by controlling the energizing of the linear solenoids 41a and 45a and setting the width of a drive pulley and a driven pulley variably.

The first and second control back pressures PB1 and PB2 respectively produced by the first and second linear solenoid valves 41 and 45 are also supplied to a second regulator valve 32 respectively via lines 74a and 74b. The second regulator valve 32 receives the control back pressure PB1 and PB2, regulates line pressure PL from a line 76 and supplies third control back-pressure PB3 corresponding to higher control back pressure of both control back pressure PB1 and PB2 to a line 77.

Referring to FIGS. 4(A) and 4(B), the second regulator valve 32 will be described in detail below. The second regulator valve 32 is comprised of a first spool 33 pressed left by a spring 34 and a second spool 35 located on the right side of the first spool 33 and arranged so that the second spool can be moved horizontally. The second regulator valve 32 regulates line pressure PL from the line 76 based upon leftward pressure applied to the first spool 33 to produce third control back pressure PB3 and supplies it to the line 77.

Therefore, the leftward pressure applied to the first spool 33 will be described below. The pressure differs depending upon which is higher of the first and second control back pressure PB1 and PB2 respectively supplied via the lines 74a and 74b. First, referring to FIG. 4(A), a case that the first control back pressure PB1 supplied via the line 74a is higher will be described. At this time, the second spool 35 is moved left, comes in contact with the first spool 33 as shown in FIG. 4(A) and the first control back pressure PB1 acts upon the first spool 33 via the second spool 35. Therefore, leftward pressure applied to the first spool 33 is equal to the resultant force of the pressure of the spring 34 and the first control back pressure PB1 and the third control back pressure PB3 is equal to oil pressure corresponding to the first control back pressure PB1.

In the meantime, if the second control back pressure PB2 supplied via the line 74b is higher, the second spool 35 is moved right and separated from the first spool 33 as shown in FIG. 4 (B). Therefore, the second control back pressure PB2 directly acts upon the first spool 33, leftward pressure applied to the first spool 33 is equal to the resultant force of the pressure of the spring 34 and the second control back pressure PB2 and the third control back pressure PB3 is equal to oil pressure corresponding to the second control back pressure PB2.

The line 77 is connected to the first regulator valve 31, the third control back pressure PB3 set as described above is used for the control back pressure of the first regulator valve 31 and line pressure PL is equivalent to oil pressure corresponding to the back pressure of the higher of the first and second control back pressure PB1 and PB2. The first and second control oil pressure PC1 and PC2 respectively corresponds to the first and second control back pressure PB1 and PB2 and line pressure PL becomes a value corresponding to the oil pressure of the higher of the first and second control oil pressure PC1 and PC2.

Figure 5:
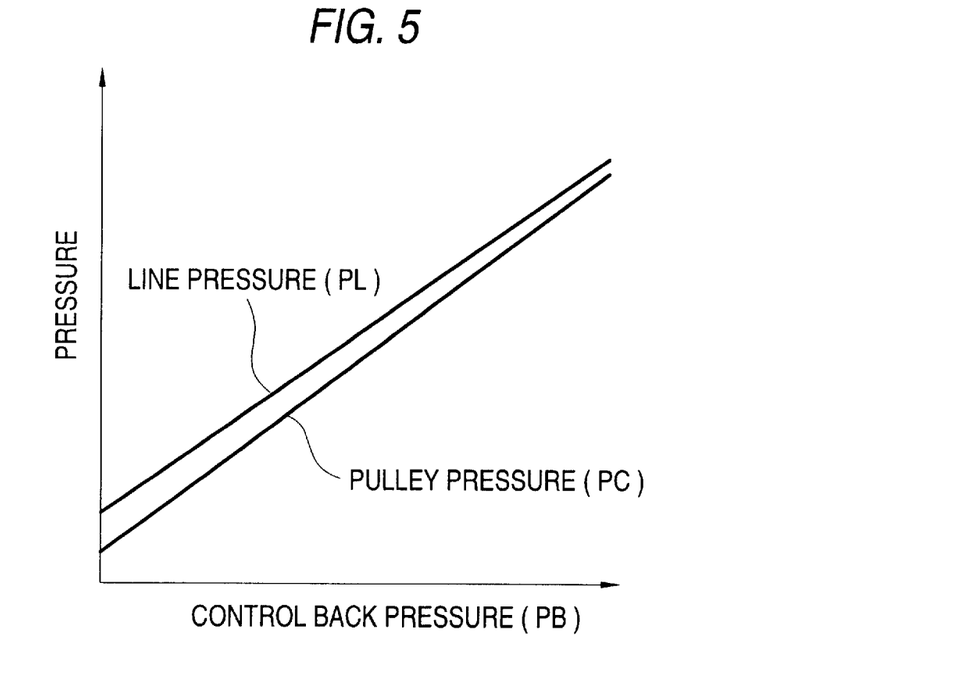
FIG. 5 is a graph showing the relationship of oil pressure controlled by the hydraulic control system.
Figure 6:
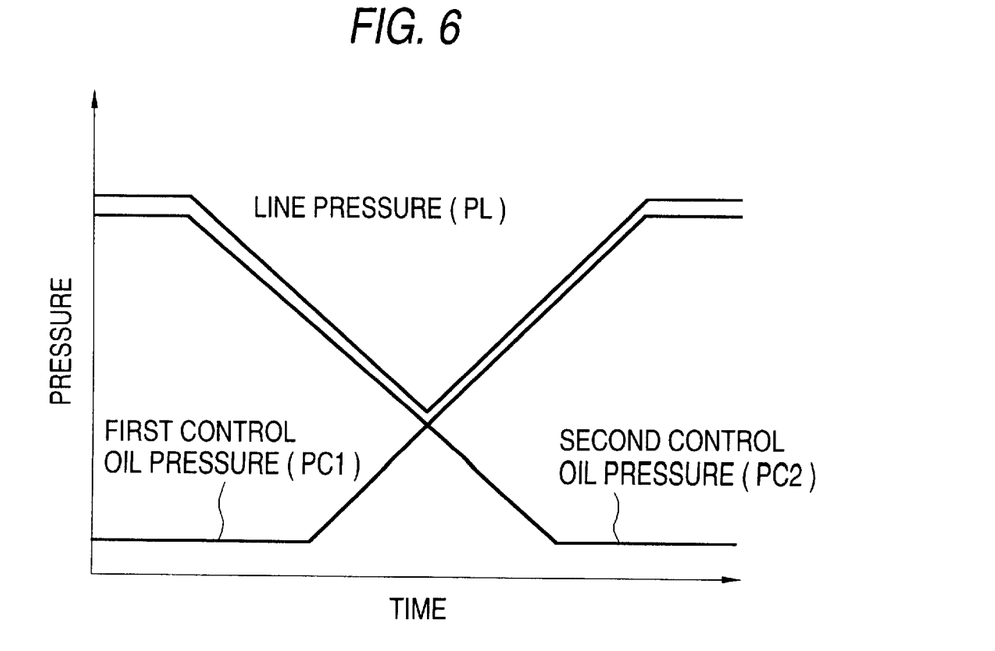
FIG. 6 is a graph showing the relationship of oil pressure controlled by the hydraulic control system.

To more detailedly describe the above relationship of oil pressure, first as shown in FIG. 5, control oil pressure PC is set in proportion to control back pressure PB produced by the first and second linear solenoid valves 41 and 45 and line pressure PL is set so that it is slightly higher than the control oil pressure PC. In actual transmission control, first and second control oil pressure PC1 and PC2 are set as shown in FIG. 6 and line pressure PL is set so that it is oil pressure slightly higher than the oil pressure of the higher of both control oil pressure.

Figure 9A:
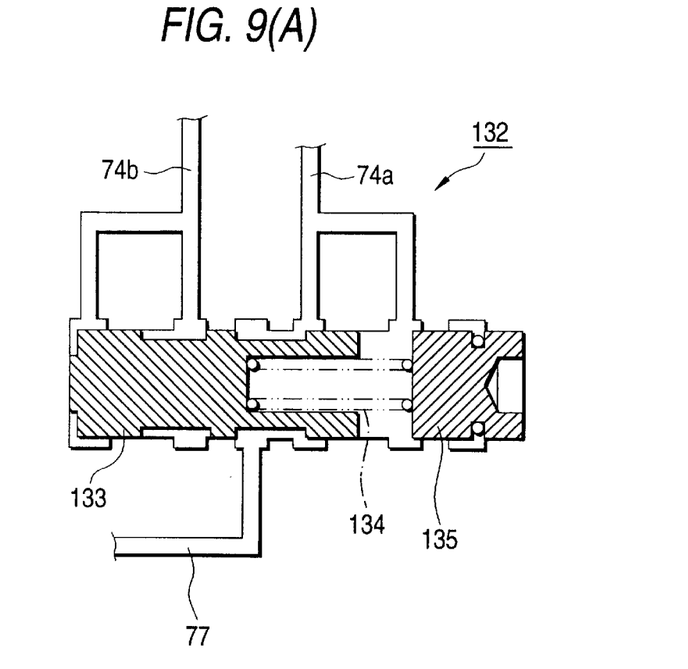
FIGS. 9(A) and 9(B) are sectional views showing a modified example of a second regulator valve shown in FIGS. 4(A) and 4(B).
Figure 9B:
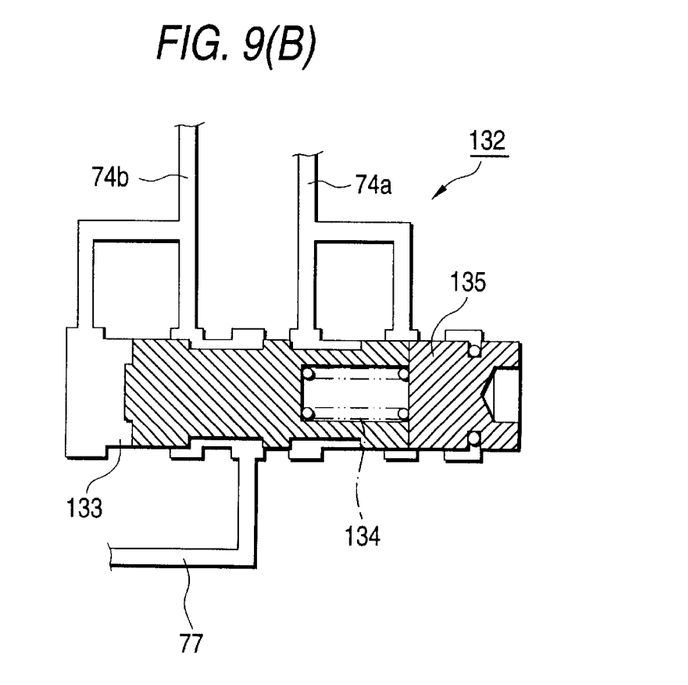

Referring to FIGS. 9 (A) and 9(B), a modified example of the second regulator valve 32 shown in FIGS. 4(A) and 4(B) will be described in detail below. A second regulator valve 132 is comprised of a movable spool 133 pressed left by a spring 134 and a stationary spool 135 located on the right side of the movable spool 133 and arranged so that the movable spool 133 can be moved horizontally. The first and second control back pressure PB1 and PB2 are respectively supplied via the lines 74a and 74b to both ends of the movable spool 133, and the movable spool 133 and the line 77 are constructed in such a manner that the movable spool 133 can switch from a first connection between the line 77 and the line 74a to a second connection between the line 77 and the line 74b, and vice versa, on the basis of its operating position. In other words, the movable spool 133 and the line 77 are constructed in such a manner that the second regulator valve 132 regulates line pressure PL based upon the operating position of the movable spool 133 and supplies it to the line 77. That is, the line pressure PL via the line 77 differs depending upon which is higher of the first and second control back pressure PB1 and PB2 respectively supplied via the lines 74a and 74b.

First, referring to FIG. 9(A), a case that the first control back pressure PB1 supplied via the line 74a is higher will be described. At this time, the movable spool 133 is moved left as shown in FIG. 9(A) and connects the line 74a with the line 77, so that the line pressure PL via the line 77 is equal to oil pressure corresponding to the first control back pressure PB1.

In the meantime, if the second control back pressure PB2 supplied via the line 74b is higher, the movable spool 135 is moved right as shown in FIG. 9(B) and connects the line 74b to the line 77, so that the line pressure PL via the line 77 is equal to oil pressure corresponding to the second control back pressure PB2.

As described above, according to the present invention, as regulator valve means regulates line pressure corresponding to control back pressure which is the higher of the first control oil pressure and the second control back pressure, line pressure PL becomes oil pressure corresponding to the control oil pressure of the higher of these even if difference between the first and second control oil pressure is large or small, and a situation caused by a conventional type that excessive difference between each pressure is made when difference between each pressure is not required and the deterioration of fuel consumption and the rise of oil temperature are generated can be prevented.

As in the hydraulic control system according to the present invention, line pressure PL is controlled not using the first and second control oil pressure PC1 and PC2 respectively supplied to drive and driven side hydraulic actuators, that is, oil pressure itself for controlling pulley width but using the first and second control back pressure PB1 and PB2 for setting these, line pressure can be immediately varied when control oil pressure varies and the responsibility of control is enhanced. Even if each capacity of the drive and driven side hydraulic actuators is different, the same line pressure control characteristic is applied to up-shift and down-shift and there is no difference in a transmission characteristic. Further, as line pressure is also automatically regulated only by controlling the first and second linear solenoid valves, only two solenoid valves and others are required and the configuration of the system is simple.

This application claims the benefit of Japanese Patent Application No. Hei. 10-53313 which is hereby incorporated by reference.

While there has been described in connection with the preferred embodiment of the invention, it will be obvious to those skilled in the art that various changes and modifications maybe made therein without departing from the invention, and it is aimed, therefore, to cover in the appended claim all such changes and modifications as fall within the true spirit and scope of the invention.

What is claimed is:

1. A hydraulic control system for a transmission including a pulley width variable drive pulley, a pulley width variable driven pulley, a belt member wound between said drive pulley and said driven pulley, a drive side hydraulic actuator for controlling a width of said drive pulley, and a driven side hydraulic actuator for controlling a width of said driven pulley, said hydraulic control system comprising:

regulator valve means (31 and 31) for regulating line pressure (PL);

a first solenoid valve (41) for producing a first control back pressure (PB1) based upon a control electric signal;

a first pulley control valve (43) for regulating said line pressure on the basis of said first control back pressure (PB1), and simultaneously setting a first control oil pressure (PC1) supplied to said drive side hydraulic actuator;

a second solenoid valve (45) for producing a second control back pressure (PB2) based upon said control electric signal; and a second pulley control valve (47) for regulating said line pressure (PL) on the basis of said second control back pressure (PB2) and simultaneously setting a second control oil pressure (PC2) supplied to said driven side hydraulic actuator, wherein:

said regulator valve means regulates and sets said line pressure in accordance with a control back pressure which is the higher of said first and second control back pressures (PB1 or PB2).

2. The hydraulic control system according to claim 1, in which said regulator valve means includes a regulator valve (32) which comprises:

a first spool (33); and a second spool (35) engageable with said first spool (33) and movable relative to said first spool in accordance with a difference between said first and second control back pressures (PB1 or PB2).

3. The hydraulic control system according to claim 1, in which said regulator valve means includes a regulator valve (32) which comprises:

a first spool (33) pressed by a spring (34) in a first direction; and a second spool (35) engageable with said first spool (33) and movable relative to said first spool in a second direction opposite to said first direction and apart from said first spool (33), in which said second spool (35) is moved in one of said first and second directions in accordance with a difference between said first and second control back pressures (PB1 or PB2).

4. The hydraulic control system according to claim 3, in which said line pressure (PL) is regulated in accordance with a third control back pressure (PB3) which is equal to the resultant force of an urging pressure of said spring (34) and one of said first and second control back pressures (PB1 or PB2).

5. The hydraulic control system according to claim 1, in which said regulator valve means includes a regulator valve (132) which comprises:

a movable spool (133) movable in a horizontal direction in accordance with a difference between said first and second control back pressures (PB1 or PB2).

* * * * *